2 Sheets—Sheet 1.
J. J. JOHNSTON.
Corn Sheller.
No. 1,096.
Reissued Dec. 11, 1860.
Fig. 1.
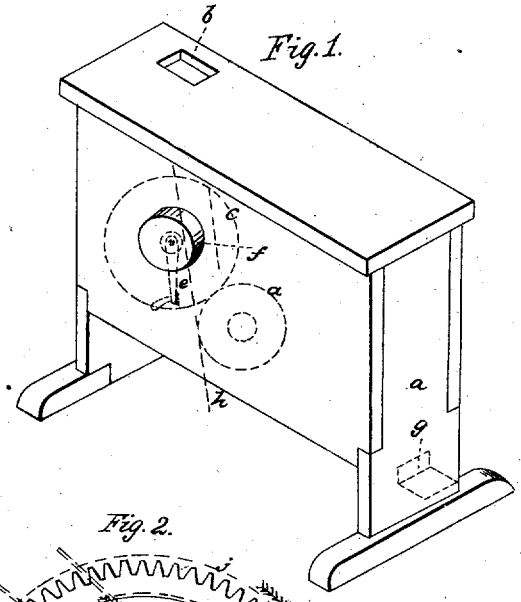
Fig. 2.
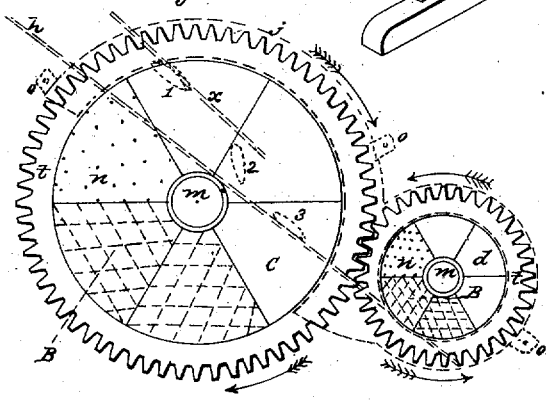
Fig. 3. Sectional View.
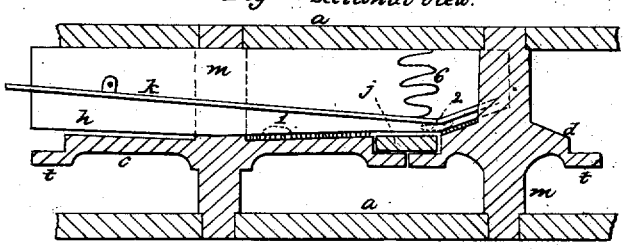
Witnesses:
Jas. B. Johnston
George P. Stick
Inventor:
James J. Johnston
N. PETERS, Photo-Lithographer, Washington, D. C.

2 Sheets—Sheet 2.

J. J. JOHNSTON.

Corn Sheller.

No. 1,096. Reissued Dec. 11, 1860.

Witnesses:

Jas. B. Johnston

Geo. P. Stick

Inventor:

James J. Johnston

N. PETERS, Photo-Lithographer, Washington, D. C.

UNITED STATES PATENT OFFICE.

JAMES J. JOHNSTON, OF ALLEGHENY, PENNSYLVANIA.

IMPROVEMENT IN CORN-SHELLERS.

Specification forming part of Letters Patent No. 23,687, dated April 19, 1859; Reissue No. 1,096, dated December 11, 1860.

*To all whom it may concern:*

Be it known that I, JAMES J. JOHNSTON, of the city and county of Allegheny, and State of Pennsylvania, have invented certain new and useful Improvements in Corn-Shellers; and I do hereby declare that the following is full and exact description thereof, reference being had to the accompanying drawings, and to the letters of reference marked thereon.

The nature of my invention consists in the combination and arrangement of two shelling-disks running in the same plane, in opposite directions, and also in the combination of the said disks with guide and spring or press plates, or the equivalents of said guide, spring, or press plates.

To enable others skilled in the art to make and use my invention, I will proceed to describe its construction and operation.

Figure 4:
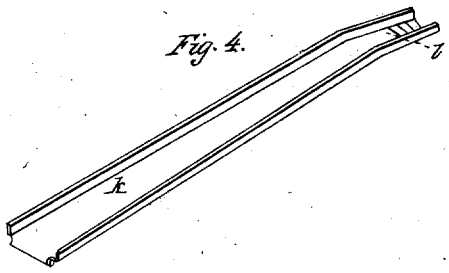
Figure 5:
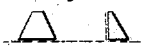
Figure 6:
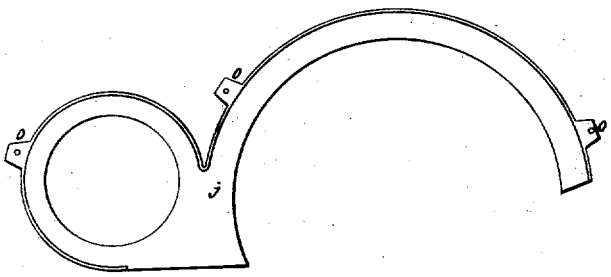
Figure 8:
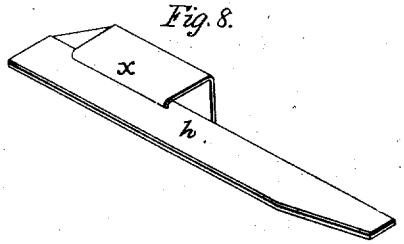
Figure 7:
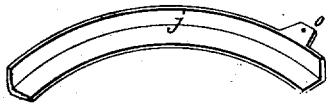

In the accompanying drawings, Figure 1 is a perspective view of the outside of the corn-sheller. Fig. 2 is a cut or sectional view representing the face of the disks, and also the arrangement of the guide-plate. Fig. 3 is an end sectional view representing the relative position of the spring-plate to the disks. Fig. 4 is a perspective view of the spring or press plate. Fig. 5 is a side and face view of the teeth, full size. Fig. 6 is a face view of the guard-plate. Fig. 7 is a broken section of the guard-plate. Fig. 8 is a perspective view of the guide plate.

*a* is the frame of the sheller. *b* is the feed-opening. *c* is the large disk. *d* is the small disk. *f* is the driving-pulley. *e* is a crank. (Represented by dotted lines.) *g* represents an opening which may be made in the end of the casing or frame *a* for the purpose of carrying out the cobs by means of a suitable chute, thereby separating them from the shelled corn. *m m* are the axles of the disks *c* and *d*. *h* is the guide-plate, which is placed above the axle of the large disk and below the axle of the small disk, and may be made in two parts, if desired. *k* is the spring-plate, which is used for pressing the ears of corn against the disks by means of the spiral spring or springs 6. This spring-plate may also be made in two parts, the upper part extending past the center of the large disk. The spring-plate *k* is furnished with a number of grooves, the object of which is to retard the forward movement of the ear and cause it to revolve a number of times before it is thrown out from between the spring-plate and lower disc. *t* are the flanges furnished with cogs. The large disk should be made slightly concave, to prevent its warping in casting, and the small disk made convex for the purpose of shelling the corn from the points or butts of the ears. The guard-plate *j* covers the upper part of the flange and cogs on the disk *c*, and covers all of the flange and cogs on the disk *d*, and is secured to the frame by the lugs *o*. This guard is only used on the large power-sheller. The teeth on the disks are so arranged as to cause the ears to revolve and be carried forward along the guide-plate *h*. I represent one-sixth of each disk as furnished with teeth. (See Fig. 2.) These teeth are placed on the disks at the intersection of the red and blue lines, their faces being placed parallel with the red lines.

The following is the manner of laying out the disks so as to bring the teeth in their proper position: The disks are divided into six equal parts by lines radiating from the center to the circumference, these dividing-lines and the arc of each division being divided into an equal number of spaces an inch, or thereabout, in length. The lines are then drawn from one point to the other, as represented at B, Fig. 2.

The operation of my improved sheller is as follows: The ear of corn is fed in at *b*, and is carried by the large disk *c* up against the part *x* of the guide plate *h*, as represented by the dotted red lines 1, Fig. 2. It is then carried along the part *x* until it passes the center of the disk *c*. It is then carried down, (as seen in Fig. 2 at the dotted red lines 2,) and comes in contact with the bottom part of guide-plate *h*, and is carried along this guide-plate (as represented at 3, Fig. 2) until it comes in contact with the small convex disk *d*. This disk will pick the corn off the point or butt of the ear, the grooves in the spring-plate *k* causing the ear to revolve a number of times to allow all parts of it to come in contact with the teeth on the face of the disk.

Having thus described the nature, construction, and operation of my invention, what I claim as of my invention, and desire to secure by Letters Patent of the United States, is—

1. The combination and arrangement of the two shelling-disks running on the same plane in opposite directions, as herein described, and for the purpose set forth.

2. The combination of the said disks with guide, spring, or press plates or their equivalents, as herein described, and for the purpose set forth.

JAMES J. JOHNSTON.

Witnesses:
C. A. CHAMBERLIN,
GEO. MATTHEWS.